United States Patent
Tsirkin

(10) Patent No.: US 12,086,456 B2
(45) Date of Patent: Sep. 10, 2024

(54) SWITCHING MEMORY CONSISTENCY MODELS IN ACCORDANCE WITH EXECUTION PRIVILEGE LEVEL

(71) Applicant: Red Hat, Inc., Raleigh, NC (US)

(72) Inventor: Michael Tsirkin, Yokneam Illit (IL)

(73) Assignee: Red Hat, Inc., Raleigh, NC (US)

( * ) Notice: Subject to any disclaimer, the term of this patent is extended or adjusted under 35 U.S.C. 154(b) by 131 days.

(21) Appl. No.: 17/850,916

(22) Filed: Jun. 27, 2022

(65) Prior Publication Data

US 2023/0418509 A1 Dec. 28, 2023

(51) Int. Cl.
G06F 12/00 (2006.01)
G06F 3/06 (2006.01)

(52) U.S. Cl.
CPC .......... *G06F 3/0655* (2013.01); *G06F 3/0604* (2013.01); *G06F 3/0679* (2013.01)

(58) Field of Classification Search
CPC .. G06F 9/4843; G06F 9/4812; G06F 12/1036; G06F 12/1491; G06F 2009/45587; G06F 2009/45591; G06F 21/52; G06F 2221/2105; G06F 3/0604; G06F 3/0655; G06F 3/0679; G06F 9/45533; G06F 9/45558; G06F 9/544; G06F 9/546
See application file for complete search history.

(56) References Cited

U.S. PATENT DOCUMENTS 7,814,378 B2 10/2010 Manovit et al.
8,392,891 B2 3/2013 Burckhardt et al.
9,128,781 B2 9/2015 Kranich et al.
2019/0205284 A1* 7/2019 Fleming ................. G06F 9/542
2021/0055948 A1* 2/2021 Tsirkin ................ G06F 9/45558

OTHER PUBLICATIONS

Lustig, et al. COATCheck: Verifying Memory Ordering at the Hardware-OS Interface. Mar. 2016, 11 pages. https://www.researchgate.net/publication/311491398_COATCheck_Verifying_Memory_Ordering_at_the_Hardware-OS_Interface. Retrieved Jun. 27, 2022.
Hou, et al. A formalisation of the SPARC TSO memory model for multi-core machine code. RA formalhttps://arxiv.org/pdf/1906.11203.pdf. Retrieved Jun. 24, 2019, 17 pages.
Islam, et al. "Bugaroo: Exposing Memory Model Bugs in Many-core Systems". Retrieved Jun. 27, 2022, 11 pages. http://people.tamu.edu/~abdullah.muzahid/files/issre 18.pdf.

(Continued)

*Primary Examiner* — Yong J Choe
(74) *Attorney, Agent, or Firm* — Dority & Manning, P.A.

(57) ABSTRACT

An example method may include executing one or more first instructions that cause the processing device to enter a privileged execution mode, switching a memory consistency model of the processing device to a strong instruction ordering mode, and executing one or more second instructions in the privileged execution mode, where the one or more second instructions are executed using the strong instruction ordering mode. The method may further include executing one or more third instructions that cause the processing device to exit the privileged execution mode, and, responsive to executing the one or more third instructions, switching the memory consistency model of the processing device to a relaxed instruction ordering mode.

20 Claims, 4 Drawing Sheets

(56) References Cited

OTHER PUBLICATIONS

Sorin, et al. "A Primer on Memory Consistency and Cache Coherence." Synthesis Lectures on Computer Architecture. Retrieved Jun. 27, 2022, 214 Pages. https://course.ece.cmu.edu/~ece847c/S15/lib/exe/fetch.php?media=part2_2_sorin12.pdf.

Bobba, et al. "Safe and efficient supervised memory systems." Feb. 2011, 8 oages. https://www.researchgate.net/publication/221574342_Safe_and_efficient_supervised_memory_systems.

"The SPARC Architecture Manual." 1991-1992, 295 pages. https://www.gaisler.com/doc/sparcv8.pdf.

* cited by examiner

SWITCHING MEMORY CONSISTENCY MODELS IN ACCORDANCE WITH EXECUTION PRIVILEGE LEVEL

TECHNICAL FIELD

The present disclosure is generally related to accessing memory in computer systems, and more particularly, to switching memory consistency models in accordance with changes in execution privilege level.

BACKGROUND

A race condition can occur in a computer system if the system can behave in different ways when different sequences of events occur, and the system does not control the determination of which sequence occurs. The system's behavior depends on which of the possible sequences actually occurs. If one or more of the possible sequences can result in incorrect system behavior, then the race condition is a bug or defect in the system, and can potentially be exploited to cause the system to perform unauthorized operations. A race condition can occur, for example, if a set of operations can execute in different orderings depending on an event that is not controlled by the system. One of the possible orderings may occur in the vast majority of executions, and the systems program code may process that ordering correctly. However, another possible ordering may occur rarely, e.g., only if particular input is received, or the system is configured in a particular way. If the other possible ordering is not processed correctly by the system, e.g., because the system designer did not expect it to occur, then the system may perform operations that produce incorrect results or compromise the system's security. Thus, race conditions can be bugs that can be exploited by an attacker to gain unauthorized access to a computer system, for example, or to cause the system to perform other operations for which the attacker is not otherwise authorized.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Figure 1:
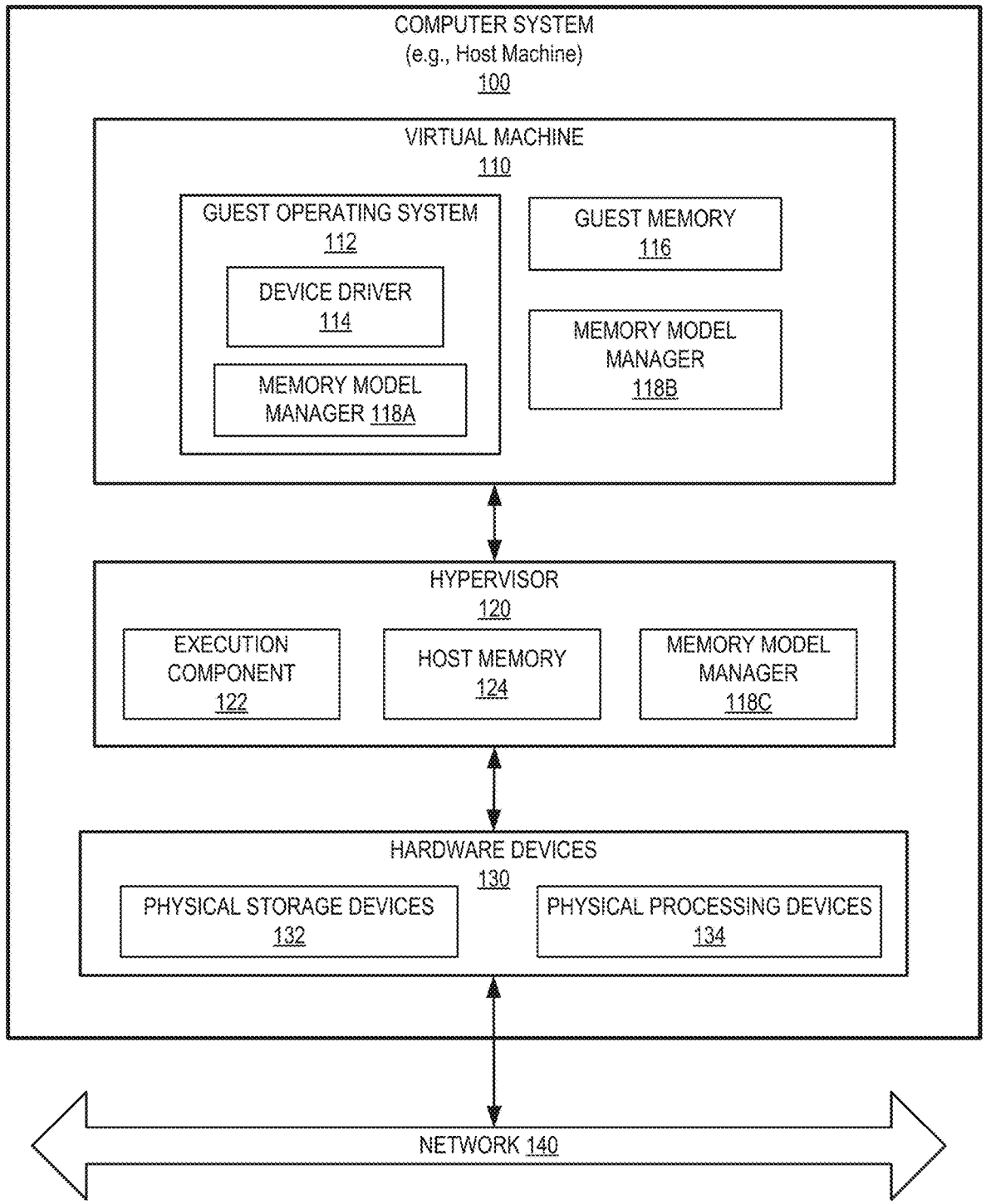
FIG. 1 depicts a high-level block diagram of an example computing system that can switch to a strong memory consistency model upon executing supervisor-level program code, in accordance with one or more aspects of the present disclosure.

Described herein are systems and methods for switching memory consistency models in accordance with changes in execution privilege level. Race conditions can result in incorrect program behavior, which can cause problems such as data corruption and unauthorized data access, particularly if the program executes at an elevated privilege level, such as a supervisor mode. A race condition can occur when two program code sequences that are executed by concurrent threads access shared data. If one of the threads modifies a data item in shared memory, and the other thread reads the data item from the shared memory, a race condition can occur. As an example, if one thread modifies data stored at a memory location, and the other thread reads from the memory location, the data read by the other thread can be a pre-modification value or a post-modification value, depending on the order in which the instructions of the two threads are executed. A program can invoke synchronization operations that control the order in which operations in different threads occur. For example, a synchronization operation can cause a thread to wait until another thread has finished modifying data at a shared memory location. Synchronization operations are generally used in application programs to avoid race conditions in which two threads access the same memory location, where at least one of the accesses is a write operation.

If the application program does not use appropriate synchronization operations to eliminate the race condition, then incorrect program behavior can, but does not necessarily, occur. Thus, a race condition bug may exist in a program, but a particular processor architecture may always execute the program's instructions in an order that does not cause incorrect program behavior.

Some processors, e.g., ARM processors, perform instruction reordering to improve performance. As a result of instruction reordering, such processors may execute operations in a different order than specified by the program code. As noted above, a program that contains a race condition bug can behave correctly on a processor architecture that perform less aggressive instruction reordering (e.g., the INTEL X86 architecture) because the processor executes the program's instructions in an order that does not cause incorrect program behavior. However, the same program can behave incorrectly on a processor architecture that performs more aggressive instruction reordering in a relaxed instruction ordering mode (e.g., the ARM architecture) because the processor executes the program's instructions in an order that causes incorrect program behavior. Such race condition bugs are subtle and can be difficult to detect in quality assurance tests. If such a race condition bug exists in program code that executes in a privileged mode, such as an operating system kernel, the resulting incorrect behavior can cause problems such as data loss, incorrect output, and security vulnerabilities that can be exploited to gain unauthorized access to the computer system.

Memory accesses, such as read operations and write operations, can be performed by a processor in accordance with a memory consistency model. "Memory consistency model" herein shall refer to a specification of the allowed behavior of multithreaded programs that access shared memory. The specification can be, for example, a set of rules specifying what values read operations may return. The memory consistency model can determine the order in which instructions are executed.

Some processor architectures, such as the ARM architecture, use relaxed memory consistency models in which instructions can be reordered for execution. Thus, the order in which instructions perform memory access operations is not necessarily the same as the order in which the instructions are executed. Such relaxed consistency models allow the processor to re-arrange memory accesses to increase performance, e.g., to avoid pipeline stalls. As an example, a program may execute a store instruction that writes data to memory, followed by a load instruction that reads data from memory. The processor, however, may re-arrange the memory operations, and perform the read operation prior to the write operation.

As an example, one memory consistency model is "sequential consistency" which specifies that events happen in program order. However, execution performance of programs in the sequential consistency model can be low. Another memory consistency model is "total store ordering" which is less strict than sequential consistency. Total store ordering allows a processor to use write buffers so that memory operations can execute more efficiently. Data written to memory can be stored in a write buffer and later stored in memory, thus reducing write latency. Read operations can retrieve data that has not yet been written to memory from the store buffer. However, store buffers are local to each processor (e.g., core), so data in a store buffer at one processor is not read by other processors until the data has been written to memory. Thus, synchronization can be used to control access to data written to memory by other cores. The total store ordering model is used by the INTEL X86 architecture, for example. Other processors can use memory consistency models that are less strict than total store ordering. For example, the ARM architecture's memory consistency model is an example of a relaxed-consistency model that allows the processor to reorder memory access operations in numerous cases. A compiler can insert synchronization operations into program code in some cases, so that the application need not perform synchronization for every case in which reordering can occur. However, the application programs may need to use synchronization operations when performing accesses on shared data if at least one of the accesses is a write operation. If application programs do not perform appropriate synchronization for such race conditions, the race conditions can cause incorrect program operation.

Aspects of the present disclosure address the above and other deficiencies by switching a processor's memory consistency model from a relaxed consistency model to a strong consistency model upon entering a privileged execution mode. The processor can subsequently be switched back to the relaxed memory consistency model upon exiting the privileged execution mode. The privileged execution mode can be a privileged mode of a processor, in which program code is permitted to execute privileged operations, such as accessing hardware resources, or memory of other users' processes, that are not permitted in an unprivileged mode.

The privileged execution mode can be active while the processor is executing instructions of, e.g., an operating system kernel invoked while an application program is executing, a hypervisor invoked while a virtual machine is executing, or other program code that has greater privileges and thus can perform more "sensitive" (e.g., capable of causing security compromises or loss) operations than the non-privileged execution mode. The privileged execution mode can be entered from an unprivileged execution mode by executing one or more instructions in the unprivileged execution mode. As an example, the unprivileged execution mode can be active while a user-space application executes, and the privileged execution mode can be active while an operating system kernel executes. The privileged execution mode can be, for example, a processor's supervisor mode. In this example, the user-space application can cause the processor to enter the privileged execution mode by invoking a kernel system call.

The strong consistency model can be, for example, a total store ordering ("TSO") model, which the processor can switch to by invoking a processor instruction that enables a TSO mode. The processor can use stronger memory consistency rules in the strong consistency model than in the relaxed consistency model. Thus, for example, the processor can perform fewer instruction re-orderings in the strong consistency model. As such, race condition bugs or other bugs that can appear as a result of executing re-ordered instructions are less likely to be encountered in the privileged execution mode. Upon exiting the privileged execution mode, e.g., upon completion of a requested kernel system call or hypervisor call, the processor can switch back to the relaxed consistency mode that was in use prior to entering the privileged execution mode. The processor can switch back to the relaxed consistency mode by invoking a processor instruction that disables TSO mode.

The systems and methods described herein include technical improvements to operating system technology. In particular, aspects of the present disclosure may improve resilience of operating system kernels, hypervisors, or other privileged execution modes to defects in their program code by executing the program code using a processor's strong memory consistency model. For example, using a strong memory consistency model when executing operating system or hypervisor program code can avoid race condition bugs in program code that could otherwise appear when the program code's instructions are re-ordered by relaxed consistency models. The strong consistency model is used when the processor is executing the privileged code, but not when the processor is executing unprivileged code, such as application code. Since privileged code ordinarily executes for relatively small amounts of time compared to unprivileged code, the reduced performance that results from using the strong consistency model is unlikely to substantially reduce overall performance of the computer system. Thus, the disclosed technique of executing privileged code using a strong consistency memory model can improve the security of privileged code on processors that use relaxed memory consistency models.

Various aspects of the above referenced methods and systems are described in details herein below by way of examples, rather than by way of limitation.

FIG. 1 depicts a high-level block diagram of an example computing system that can switch to a strong memory consistency model upon executing supervisor-level program code, in accordance with one or more aspects of the present disclosure. It should be noted that other architectures for computer system 100 are possible, and that the implementation of a computing device utilizing embodiments of the disclosure are not necessarily limited to the specific architecture depicted. Computer system 100 may be a single host machine or multiple host machines arranged in a cluster and may include a rackmount server, a workstation, a desktop computer, a notebook computer, a tablet computer, a mobile phone, a palm-sized computing device, a personal digital assistant (PDA), etc. In one example, computer system 100 may be a computing device implemented with x86 hardware. In another example, computer system 100 may be a computing device implemented with ARM®, PowerPC®, SPARC®, or other hardware. In the example shown in FIG. 1, computer system 100 may include virtual machine 110, hypervisor 120, and hardware devices 130, and may communicate with other computer systems via a network 140. In other examples, computer system 100 does not necessarily include the virtual machine 110 and/or the hypervisor 120.

One or more virtual machines 110 may execute guest executable code that uses an underlying emulation of the physical resources. The guest executable code may include a guest operating system, guest applications, guest device drivers, etc. Virtual machines 110 may support hardware emulation, full virtualization, para-virtualization, operating system-level virtualization, or a combination thereof. Virtual machines 110 may have the same or different types of guest operating systems 112, such as Microsoft®, Windows®, Linux®, Solaris®, etc. Guest operating system 112 may include a kernel, which may execute in a supervisor mode of physical processing device(s) 134. Each virtual machine 110 may execute guest operating system 112 that manages device driver 114 and guest memory 116. Device driver 114 may be any type of virtual or physical device driver, such as, for example, a virtual CPU (vCPU) driver. Device driver 114 may be used to interact with, e.g., send data to and received data from, hardware devices 130. The features provided by device driver 114 may be integrated into the operations performed by guest operating system 112.

Guest memory 116 may be any virtual memory, logical memory, physical memory, other portion of memory, or a combination thereof for storing, organizing, or accessing data. Guest memory 116 may represent the portion of memory of computer system 100 that is designated by hypervisor 120 for use by virtual machine 110. Guest memory 116 may be managed by guest operating system 112.

Host memory 124 (e.g., hypervisor memory) may be the same or similar to the guest memory but may be managed by hypervisor 120 instead of a guest operating system. Host memory 124 may include host pages, which may be in different states. The states may correspond to unallocated memory, memory allocated to guests, and memory allocated to hypervisor. The unallocated memory may be host memory pages that have not yet been allocated by host memory 124 or were previously allocated by hypervisor 120 and have since been deallocated (e.g., freed) by hypervisor 120. The memory allocated to guests may be a portion of host memory 124 that has been allocated by hypervisor 120 to virtual machine 110 and corresponds to guest memory 116. Other portions of hypervisor memory may be allocated for use by hypervisor 120, a host operating system, hardware device, other module, or a combination thereof.

Hypervisor 120 may also be known as a virtual machine monitor (VMM) and may provide virtual machine 110 with access to one or more features of the underlying hardware devices 130. In the example shown, hypervisor 120 may run directly on the hardware of computer system 100 (e.g., bare metal hypervisor). In other examples, hypervisor 120 may run on or within a host operating system (not shown). Hypervisor 120 may manage system resources, including access to hardware devices 130. In the example shown, hypervisor 120 may include an execution component 122

Execution component 122 may perform operations that implement features of hypervisor 120. For example, virtual machine 110 can perform a VM Exit operation, which may cause a transition from virtual machine 110 to hypervisor 120. Hypervisor 120 may then perform appropriate operations, and may subsequently restart the virtual machine 110, e.g., by performing a VM Enter operations that switch to the virtual machine 110. Hardware devices 130 may provide hardware resources and functionality for performing computing tasks. Hardware devices 130 may include one or more physical storage devices 132, one or more physical processing devices 134, other computing devices, or a combination thereof. One or more of hardware devices 130 may be split up into multiple separate devices or consolidated into one or more hardware devices. Some of the hardware device shown may be absent from hardware devices 130 and may instead be partially or completely emulated by executable code.

Physical storage devices 132 may include any data storage device that is capable of storing digital data and may include volatile or non-volatile data storage. Volatile data storage (e.g., non-persistent storage) may store data for any duration of time but may lose the data after a power cycle or loss of power. Non-volatile data storage (e.g., persistent storage) may store data for any duration of time and may retain the data beyond a power cycle or loss of power. In one example, physical storage devices 132 may be physical memory and may include volatile memory devices (e.g., random access memory (RAM)), non-volatile memory devices (e.g., flash memory, NVRAM), and/or other types of memory devices. In another example, physical storage devices 132 may include one or more mass storage devices, such as hard drives, solid state drives (SSD)), other data storage devices, or a combination thereof. In a further example, physical storage devices 132 may include a combination of one or more memory devices, one or more mass storage devices, other data storage devices, or a combination thereof, which may or may not be arranged in a cache hierarchy with multiple levels.

Physical processing devices 134 ("processors") may include one or more processors that are capable of executing the computing tasks. Each processor 134 may be a single core processor that is capable of executing one instruction at a time (e.g., single pipeline of instructions) or may be a multi-core processor that simultaneously executes multiple instructions. The instructions may encode arithmetic, logical, or I/O operations. In one example, processors 134 may be implemented as a single integrated circuit, two or more integrated circuits, or may be a component of a multi-chip module (e.g., in which individual microprocessor dies are included in a single integrated circuit package and hence share a single socket). A physical processing device may also be referred to as a central processing unit ("CPU").

Processor 134 may execute instructions in accordance with a memory consistency model. For example, processor 134 may use a relaxed memory consistency model that allows processor 134 to re-order instructions, such as memory read instructions and memory write instructions, in specified situations. Processor 134 may provide an instruction or configuration register that can be used to switch processor 134's memory consistency model between the relaxed memory consistency model and a stricter memory consistency model that allows processor 134 to re-order instructions in fewer specified situations than the relaxed memory consistency model. The stricture memory consistency model may be a total store order model or a sequential consistency model, for example. The sequential consistency model may specify that instructions are to be executed in the order in which they occur in the program ("program order"). The total store order model may be similar to the sequential consistency model, except that the total store order model does not require that a write operation followed by a read operation be performed in the same order on other processors that access the same memory location.

Network 140 may be a public network (e.g., the internet), a private network (e.g., a local area network (LAN), a wide area network (WAN)), or a combination thereof. In one example, network 140 may include a wired or a wireless infrastructure, which may be provided by one or more wireless communications systems, such as a wireless fidelity (WiFi) hotspot connected with the network 140 and/or a wireless carrier system that can be implemented using various data processing equipment, communication towers, etc.

A memory model manager 118 can change a processor's memory consistency model so that the processor uses a strong memory consistency model when executing one or more instructions in a privileged execution mode. The privileged execution mode can be, for example, a processor mode that permits execution of one or more instructions that are not permitted in a non-privileged execution mode. If the processor has multiple privileged execution modes that can be ordered from a lowest privilege mode to a highest privilege mode, then the memory model manager 118 can change the processor's memory consistency model so that the processor uses a stronger memory consistency model when executing instructions in a higher-privilege mode. Conversely, the memory model manager 118 can change the processor's memory consistency model so that the processor uses a relaxed (e.g., weaker) memory consistency model when executing instructions in a lower-privilege mode.

The memory model manager 118 can change a processor's memory consistency model to the strong memory consistency model upon detecting that the processor has switched from non-privileged mode to privileged mode or is expected to switch from non-privileged mode to privileged mode. For example, the kernel can include a privileged mode detection function, implemented as program code instructions, that is executed each time the processor invokes a privileged mode operation (e.g., each time the processor transfers control to the kernel). The privileged mode detection function can cause the processor's memory consistency model to be switched to the strong memory consistency model. The kernel can also include an expected privileged mode detection function that detects upcoming privileged mode operations or transitions that have not been executed yet. The function can monitor data structures for indications of upcoming privileged mode instructions. For example, the function can monitor timer data structures for timers that have been scheduled to perform a privileged-mode operation at a time in the future, and schedule a switch to the strong memory consistency model to occur at a time prior to, at the same time as, or subsequent to the time that the privileged-mode operation is scheduled to occur.

As another example, the memory model manager 118 can include a strong consistency mode enabling function that is invoked by certain kernel functions, e.g., at the start of kernel functions that perform operations susceptible to race conditions or security attacks. The strong consistency mode enabling function can switch to a strong consistency mode, e.g., a strong instruction ordering mode such as a TSO mode. Further, the memory model manager 118 can include a relaxed consistency mode enabling function that is invoked by certain kernel functions, e.g., at the start of kernel functions that perform operations that are known to be unsusceptible to race conditions or security attacks. The relaxed consistency mode enabling function can switch to a relaxed consistency mode, e.g., a relaxed instruction ordering mode such as a default instruction ordering mode of the ARM architecture. Thus, the memory model manager 118 can switch the processor's memory consistency mode in response to, asynchronously with, or before a change in the privilege level at which the processor is executing program code instructions.

The memory model manager 118 can be included in one or more of the guest operating system 112, the virtual machine 110, or the hypervisor 120. For example, a memory model manager 118A can be included in the guest operating system 112. In other examples, a memory model manager 118B can be included in the virtual machine 110, and/or a memory model manager 118C can be included in the hypervisor 120. Thus, a memory model manager 118 may operate at the guest operating system level, the virtual machine level, or the hypervisor level. Further, the memory model manager 118 may include components at two or more of the levels, and each of the components may perform a portion of the memory model management described herein, e.g., in cooperation with other components.

The memory model manager 118 can switch a processor's instruction ordering mode from a relaxed ordering mode to a strong ordering mode in response to the processor entering a privileged execution mode or other privileged execution environment. The privileged execution mode can be, for example, a kernel mode (also referred to as a supervisor mode) that enables the processor to execute privileged instructions that are not permitted in a non-privileged execution mode. The privileged mode instructions can include instructions that perform one or more of the following operations: Input/Output (I/O), halting or resetting the processor, disabling interrupts, setting timers, context switching, mapping memory addresses, flushing or invalidating a data cache, reading system registers, deleting processes, changing device status, and so on. The non-privileged mode can be, for example, a user mode of a processor. In the non-privileged mode, the processor can execute non-privileged instructions that can include any processor instructions that are not privileged instructions.

The processor can subsequently be switched back to the relaxed instruction ordering mode upon exiting the privileged execution mode. The privileged execution mode can be an operating mode of a processor, in which program code is permitted to execute privileged operations, such as accessing hardware resources, or memory of other users' processes, that are not permitted in an unprivileged mode. The instructions executed by the processor in the privileged execution mode can be executed in response to one or more of an operating system kernel invoked while an application program is executing, a hypervisor invoked while a virtual machine is executing, a portion of application program code, or other program code. If, upon entering a privileged execution mode, the processor determines that the processor's memory consistency model is already the strong consistency model (e.g., the processor is already in a strong instruction ordering mode), then the processor need not switch the memory consistency model to the strong consistency model. This case can occur when the application is running an emulator, e.g., an X86 emulator, and the processor is using the strong consistency model in the unprivileged execution mode.

The privileged execution mode can be entered from an unprivileged execution mode in response to one or more events. The events can include a kernel system call, a hardware interrupt, an inter-processor interrupt, a timer interrupt, or a memory fault, or other switch to executing kernel program code. Each of these events can involve executing one or more instructions by the processor, so the privileged execution mode can be entered in response to executing one or more instructions that correspond to the respective processor event. The instructions that cause the transition to the privileged execution mode can be executed in the unprivileged execution mode. In one example, a user-space application can invoke a kernel system call that causes the processor to enter the kernel. As another example, an interrupt can cause the processor to enter the kernel. Upon entering the kernel, the processor can execute kernel program code in privileged mode. The memory model manager 118 can change a processor's memory consistency model from a relaxed consistency model to a strong consistency model in response to the processor entering the kernel. As another example, a virtual machine can invoke a VM Exit call (e.g., that switches from a virtual machine to a hypervisor), or other instruction that causes the processor to execute hypervisor program code in a privileged hypervisor mode. As still another example, a user-space application executing in a non-privileged mode can invoke an operation that causes the processor to execute application code in a privileged user-space mode.

An operating system can provide an address space isolation ("ASI") feature, which can be used to detect potentially incorrect or malicious program code executing in the kernel. Using the ASI feature, the kernel ordinarily executes in a less-privileged mode in which the kernel has access to a specified region of memory. Memory regions outside the specified region are in separate address spaces, e.g., not listed in the kernel's page tables. If the kernel attempts to access memory outside the specified region, then a page fault (e.g., interrupt) occurs. The page fault can prevent speculative execution attacks, since speculative execution stops when the page fault occurs. The memory model manager 118 can switch the processor to a strong consistency model when an application accesses a memory location outside an isolated memory region. For example, the memory region manager 118 can switch the processor's memory consistency model to a strong consistency model in response to the page fault that indicates an attempt to access a different address space.

The strong consistency model can be, for example, a total store ordering ("TSO") model, which the processor can switch to by invoking a processor instruction (or performing other appropriate action) that enables a TSO mode. The memory model manager 118 can invoke the processor instruction that enables TSO mode in response to the processor entering a privileged execution mode. The processor can use stronger memory consistency rules in the strong consistency model than in the relaxed consistency model. Thus, for example, the processor performs fewer instruction re-orderings in the strong consistency model. As such, race condition bugs or other bugs that can appear as a result of executing re-ordered instructions are less likely to be encountered in the privileged execution mode.

Upon exiting the privileged execution mode, e.g., upon completion of a requested kernel system call or hypervisor call, the processor can switch back to the consistency model that was in use prior to entering the privileged execution mode. The prior model can be a relaxed consistency model, for example. The relaxed consistency model can be, for example, a relaxed instruction ordering mode of the ARM architecture. The processor can switch back to the relaxed consistency model by invoking a processor instruction (or performing other appropriate action) that disables TSO mode and switches the processor to a relaxed (e.g., weaker than TSO) instruction ordering mode. If the prior model is the strong consistency model, or the processor did not switch consistency models upon entering the privileged execution mode, then the processor need not switch the consistency model upon exiting the privileged execution mode.

The changing of the processor's memory consistency model from a relaxed consistency model to a strong consistency model can be disabled using an appropriate configuration parameter setting. For example, an application program or a system management tool can disable the use of the strong consistency model by setting a configuration parameter to an appropriate value. The use of the strong consistency model can be disabled if, for example, computationally-intensive operations are to be performed, or increased performance is desired.

Figure 2:
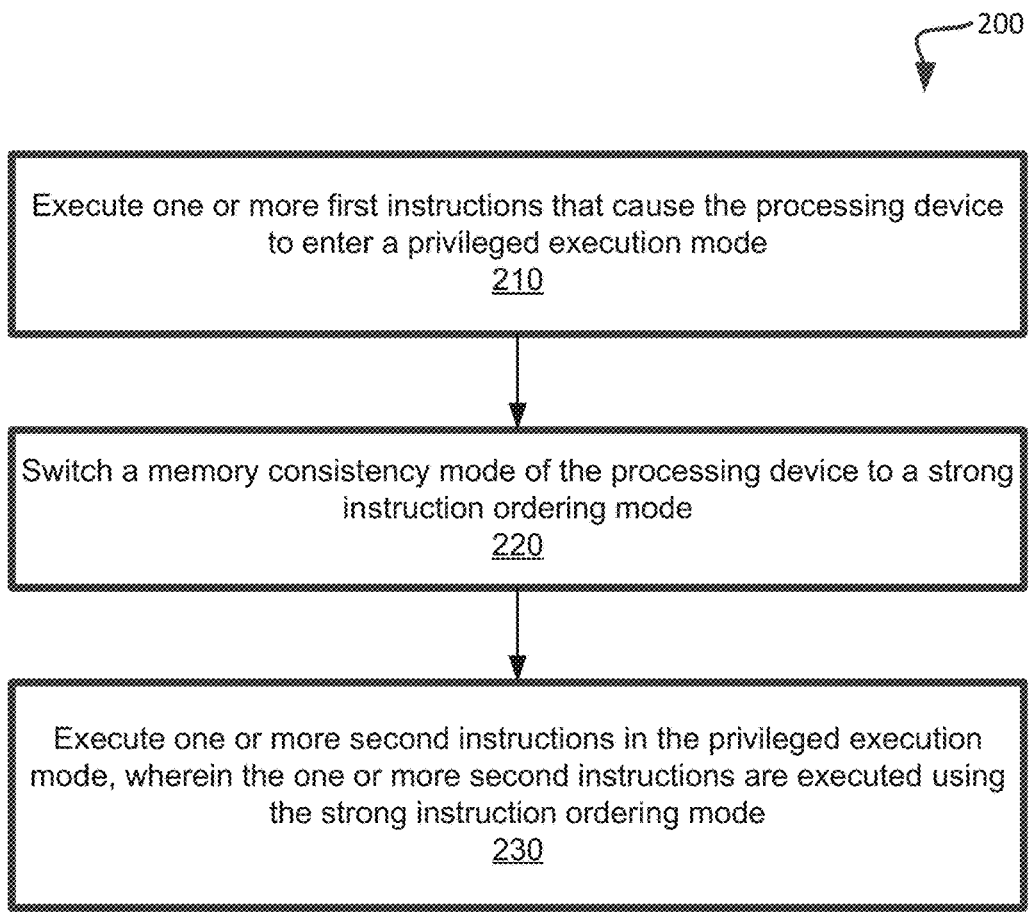
FIG. 2 depicts a flow diagram of an example method for a processor to change a memory consistency mode to a stricter mode upon entering a privileged execution mode, in accordance with one or more aspects of the present disclosure.

FIG. 2 depicts a flow diagram of an example method 200 for a processor to change a memory consistency mode to a stricter mode upon entering a privileged execution mode, in accordance with one or more aspects of the present disclosure. Method 200 and each of its individual functions, routines, subroutines, or operations may be performed by one or more processors of the computer device executing the method. In certain implementations, method 200 may be performed by a single processing thread. Alternatively, method 200 may be performed by two or more processing threads, each thread executing one or more individual functions, routines, subroutines, or operations of the method. In an illustrative example, the processing threads implementing method 200 may be synchronized (e.g., using semaphores, critical sections, and/or other thread synchronization mechanisms). Alternatively, the processes implementing method 200 may be executed asynchronously with respect to each other.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, method 200 may be performed by a computer system 100 as shown in FIG. 1 or by an executable code of a host machine (e.g., host operating system or firmware), a virtual machine (e.g., guest operating system or virtual firmware), an external device (e.g., a PCI device), other executable code, or a combination thereof.

Method 200 may be performed by processing devices of a server device or a client device and may begin at block 210. At block 210, a computer system 100 may execute one or more first instructions that cause the processing device to enter a privileged execution mode. The instructions can include a kernel system call, an instruction executed as part of a kernel system call, or a VM exit instruction, for example. As another example, the instructions can include an interrupt handler that causes the processor to enter a privileged mode. As still another example, the instructions can include a page fault handler that is invoked in response to the kernel attempting to access memory outside of a specified region. The specified region may be configured using an address space isolation (ASI) feature of the kernel. The page fault can prevent speculative execution attacks, since speculative execution stops when the page fault occurs. The memory model manager 118 can switch the processor to a strong consistency model when an application accesses a memory location outside an isolated memory region. Switching the memory consistency mode of the processing device can be responsive to executing the one or more first instructions.

The one or more first instructions can be executed in response to one or more of: a kernel system call, a hardware interrupt, an inter-processor interrupt, a timer interrupt, or a memory fault. The one or more first instructions are executed by application program code, the application program code is associated with an isolated address space, and switching the memory consistency mode of the processing device to the strong instruction ordering mode is responsive to an instruction of the application program code attempting to access a memory location having an address outside the isolated address space.

The privileged execution mode can be a hypervisor mode of the processing device, and the one or more second instructions can be part of a hypervisor. The privileged execution mode can be a privileged user-space mode of the processing device, and the one or more second instructions can be part of an application program.

At block 220, the computer system 100 may switch a memory consistency mode of the processing device to a strong instruction ordering mode. The instructions can include an instruction that causes the processor to enter a TSO mode, for example. At block 230, the computer system 100 may execute one or more second instructions in the privileged execution mode, wherein the one or more second instructions are executed using the second consistency model. Responsive to completing the operations described herein above with reference to block 230, the method may terminate.

Figure 3:
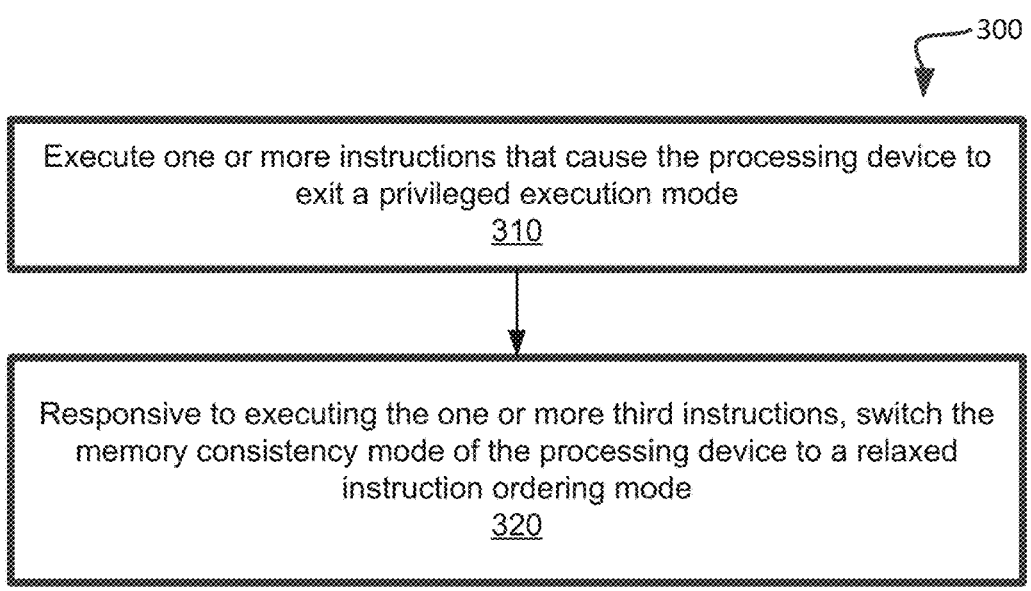
FIG. 3 depicts a flow diagram of an example method for a processor to change a memory consistency mode to a weaker mode upon exiting a privileged execution mode, in accordance with one or more aspects of the present disclosure.

FIG. 3 depicts a flow diagram of an example method 300 for a processor to change a memory consistency mode to a weaker mode upon exiting a privileged execution mode, in accordance with one or more aspects of the present disclosure. Method 300 and each of its individual functions, routines, subroutines, or operations may be performed by one or more processors of the computer device executing the method. In certain implementations, method 300 may be performed by a single processing thread. Alternatively, method 300 may be performed by two or more processing threads, each thread executing one or more individual functions, routines, subroutines, or operations of the method. In an illustrative example, the processing threads implementing method 300 may be synchronized (e.g., using semaphores, critical sections, and/or other thread synchronization mechanisms). Alternatively, the processes implementing method 300 may be executed asynchronously with respect to each other.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, method 300 may be performed by computer system 100 as shown in FIG. 1 or by an executable code of a host machine (e.g., host operating system or firmware), a virtual machine (e.g., guest operating system or virtual firmware), an external device (e.g., a PCI device), other executable code, or a combination thereof.

Method 300 may be performed by processing devices of a server device or a client device and may begin at block 310. At block 310, a computer system 100 may execute one or more instructions that cause the processing device to exit a privileged execution mode. The instructions can include, for example, a return from a kernel system call or a VM enter instruction (that switches from a hypervisor to a virtual machine), a return from an interrupt handler, or any other suitable instruction that causes the processor to switch from privileged to non-privileged execution mode.

At block 320, the computer system 100 may, responsive to executing the one or more third instructions, switch the memory consistency mode of the processing device to a relaxed instruction ordering mode. The processor can change the memory consistency model to the relaxed consistency model by executing a processor instruction that switches out of TSO mode. The instruction that switches out of TSO mode may cause the processor to switch to a relaxed consistency model. Responsive to completing the operations described herein above with reference to block 320, the method may terminate.

Figure 4:
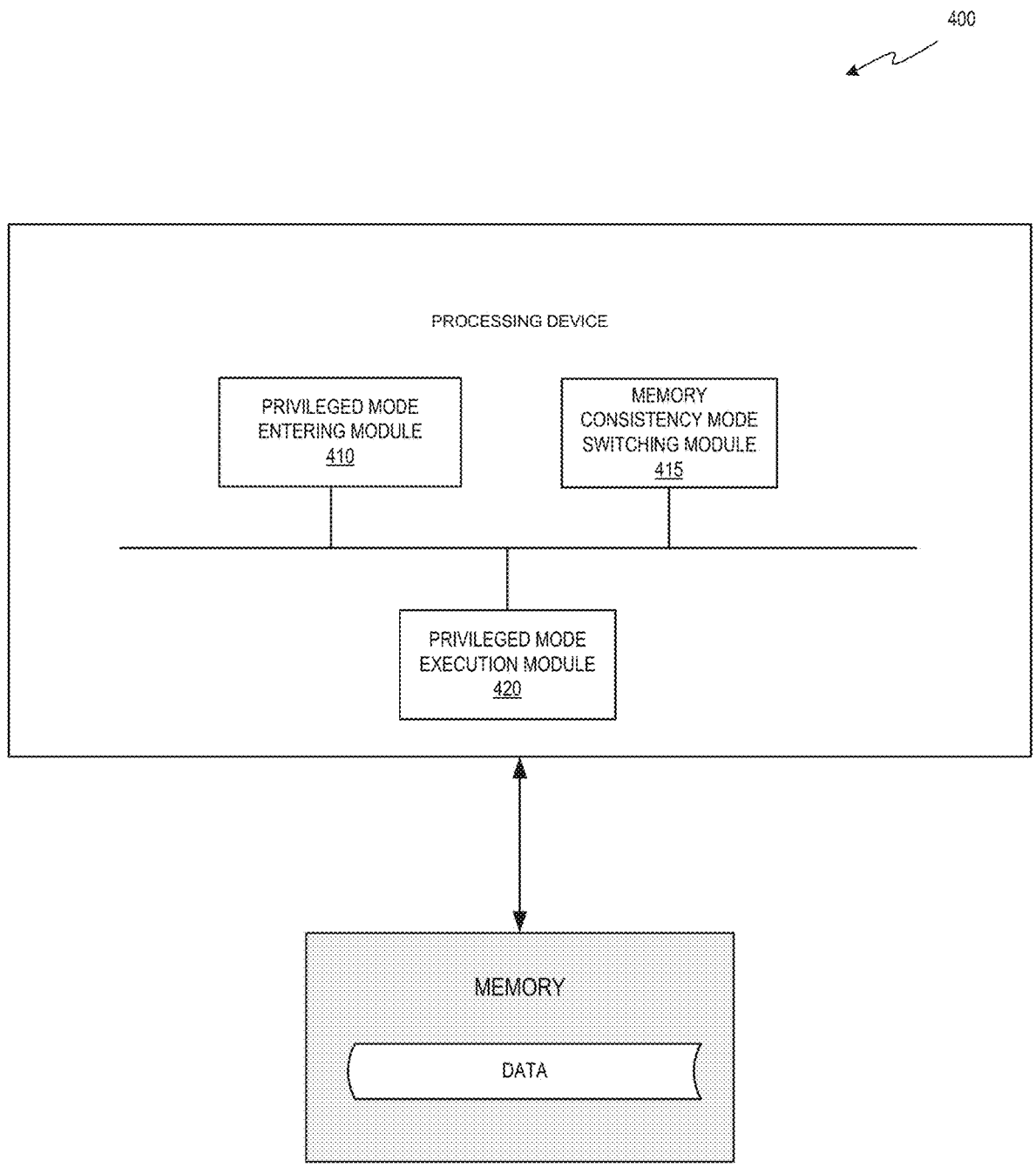
FIG. 4 depicts a block diagram of an example computer system in accordance with one or more aspects of the present disclosure.

FIG. 4 depicts a block diagram of a computer system 400 operating in accordance with one or more aspects of the present disclosure. Computer system 400 may be the same or similar to source computer system 100 of FIG. 1, and may include one or more processors and one or more memory devices. In the example shown, computer system 400 may include a privileged mode entering module 410, a memory consistency mode switching module 415, and a privileged mode execution module 420.

Privileged mode entering module 410 may enable a processor of the computer system to execute one or more first instructions that cause the processor to enter a privileged execution mode. The first instructions may be executed in response to one or more of: a kernel system call, a hardware interrupt, an inter-processor interrupt, a timer interrupt, or a memory fault. The privileged execution mode may be, e.g., a supervisor mode of the processing device, and the one or more second instructions may be part of an operating system kernel or a virtual machine. As another example, the privileged execution mode may be a hypervisor mode of the processing device, and the one or more second instructions may be part of a hypervisor.

Memory consistency mode switching module 415 may enable the processor to switch a memory consistency mode of the processing device to a strong instruction ordering mode. The strong instruction ordering mode may be a total store ordering (TSO) mode, for example. Privileged mode execution module 420 may enable the processor to execute one or more second instructions in the privileged execution mode, where the one or more second instructions are executed using the strong instruction ordering mode.

Figure 5:
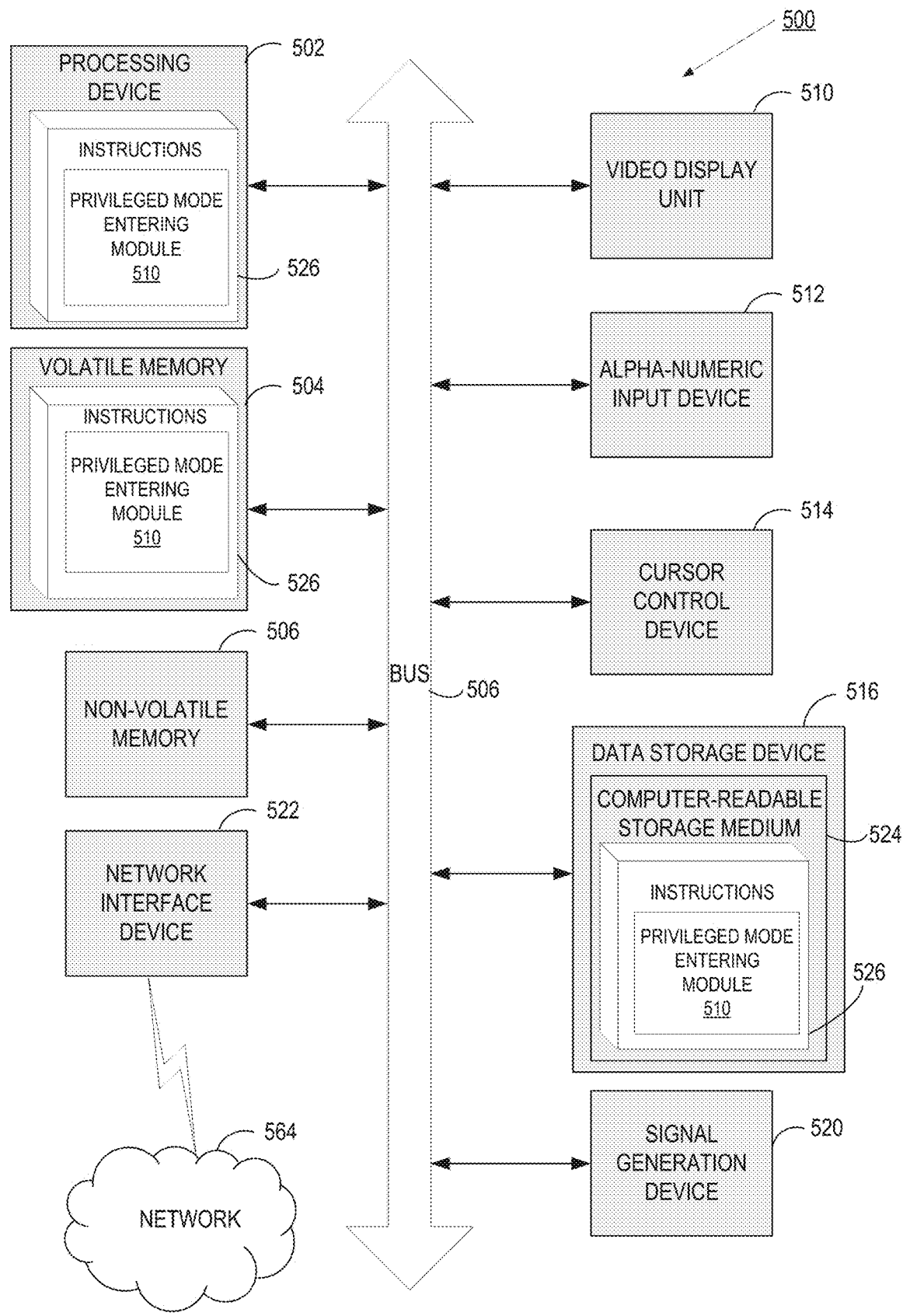
FIG. 5 depicts a block diagram of an illustrative computing device operating in accordance with the examples of the present disclosure.

FIG. 5 depicts a block diagram of a computer system operating in accordance with one or more aspects of the present disclosure. In various illustrative examples, computer system 500 may correspond to computer system 100 of FIG. 1. Computer system 500 may be included within a data center that supports virtualization. Virtualization within a data center results in a physical system being virtualized using virtual machines to consolidate the data center infrastructure and increase operational efficiencies. A virtual machine (VM) may be a program-based emulation of computer hardware. For example, the VM may operate based on computer architecture and functions of computer hardware resources associated with hard disks or other such memory. The VM may emulate a physical environment, but requests for a hard disk or memory may be managed by a virtualization layer of a computing device to translate these requests to the underlying physical computing hardware resources. This type of virtualization results in multiple VMs sharing physical resources.

In certain implementations, computer system 500 may be connected (e.g., via a network, such as a Local Area Network (LAN), an intranet, an extranet, or the Internet) to other computer systems. Computer system 500 may operate in the capacity of a server or a client computer in a client-server environment, or as a peer computer in a peer-to-peer or distributed network environment. Computer system 500 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 500 may include a processing device 502, a volatile memory 504 (e.g., random access memory (RAM)), a non-volatile memory 506 (e.g., read-only memory (ROM) or electrically-erasable programmable ROM (EEPROM)), and a data storage device 516, which may communicate with each other via a bus 508.

Processing device 502 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 500 may further include a network interface device 522. Computer system 500 also may include a video display unit 510 (e.g., an LCD), an alpha-numeric input device 512 (e.g., a keyboard), a cursor control device 514 (e.g., a mouse), and a signal generation device 520.

Data storage device 516 may include a non-transitory computer-readable storage medium 524 on which may store instructions 526 encoding any one or more of the methods or functions described herein, including instructions for implementing method 400 or 500.

Instructions 526 may also reside, completely or partially, within volatile memory 504 and/or within processing device 502 during execution thereof by computer system 500, hence, volatile memory 504 and processing device 502 may also constitute machine-readable storage media.

While computer-readable storage medium 524 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

Other computer system designs and configurations may also be suitable to implement the system and methods described herein. The following examples illustrate various implementations in accordance with one or more aspects of the present disclosure.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "determining," "deriving," "encrypting," "creating," "generating," "using," "accessing," "executing," "obtaining," "storing," "transmitting," "providing," "establishing," "receiving," "identifying," "initiating," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform method 400 or 500 and/or each of its individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A system comprising:
a memory device comprising a group of memory units; and
a processing device, operatively coupled to the memory device, to perform operations comprising:
executing one or more first instructions that cause the processing device to enter a privileged execution mode;
switching a memory consistency mode of the processing device to a strong instruction ordering mode;
executing one or more second instructions in the privileged execution mode, wherein the one or more second instructions are executed using the strong instruction ordering mode;
switching the memory consistency mode of the processing device to a relaxed instruction ordering mode; and
executing one or more additional instructions using the relaxed instruction ordering mode.

2. The system of claim 1,
wherein switching the memory consistency mode of the processing device to the relaxed instruction ordering mode is responsive to executing one or more third instructions that cause the processing device to exit the privileged execution mode.

3. The system of claim 1, wherein switching the memory consistency mode of the processing device to the strong instruction ordering mode is responsive to executing the one or more first instructions.

4. The system of claim 1, wherein the one or more first instructions are executed in response to one or more of: a kernel system call, a hardware interrupt, an inter-processor interrupt, a timer interrupt, or a memory fault.

5. The system of claim 1, wherein the one or more first instructions are executed by application program code, the application program code is associated with an isolated address space, and switching the memory consistency mode of the processing device to the strong instruction ordering mode is responsive to an instruction of the application program code attempting to access a memory location having an address outside the isolated address space.

6. The system of claim 5, wherein switching the memory consistency mode of the processing device to the strong instruction ordering mode is responsive to a page fault that indicates an attempt to access a memory location having an address outside the isolated address space.

7. The system of claim 1, wherein the privileged execution mode comprises a supervisor mode of the processing device, and wherein the one or more second instructions are comprised by an operating system kernel or a virtual machine.

8. The system of claim 1, wherein the privileged execution mode comprises a hypervisor mode of the processing device, and wherein the one or more second instructions are comprised by a hypervisor.

9. The system of claim 1, wherein the privileged execution mode comprises a privileged user-space mode of the processing device, and wherein the one or more second instructions are comprised by an application program.

10. The system of claim 1, wherein the strong instruction ordering mode comprises a total store ordering mode.

11. A method comprising:
executing, by a processing device, one or more first instructions that cause the processing device to enter a privileged execution mode;
switching a memory consistency mode of the processing device to a strong instruction ordering mode;
executing one or more second instructions in the privileged execution mode, wherein the one or more second instructions are executed using the strong instruction ordering mode;
switching the memory consistency mode of the processing device to a relaxed instruction ordering mode; and
executing one or more additional instructions using the relaxed instruction ordering mode.

12. The method of claim 11,
wherein switching the memory consistency mode of the processing device to the relaxed instruction ordering mode is responsive to executing one or more third instructions that cause the processing device to exit the privileged execution mode.

13. The method of claim 11, wherein switching the memory consistency mode of the processing device to the strong instruction ordering mode is responsive to executing the one or more first instructions.

14. The method of claim 11, wherein the one or more first instructions are executed in response to one or more of: a kernel system call, a hardware interrupt, an inter-processor interrupt, a timer interrupt, or a memory fault.

15. The method of claim 11, wherein the one or more first instructions are executed by application program code, the application program code is associated with an isolated address space, and switching the memory consistency mode of the processing device to the strong instruction ordering mode is responsive to an instruction of the application program code attempting to access a memory location having an address outside the isolated address space.

16. A non-transitory machine-readable storage medium storing instructions that cause a processing device to perform operations comprising:
executing one or more first instructions that cause the processing device to enter a privileged execution mode;
switching a memory consistency mode of the processing device to a strong instruction ordering mode;
executing one or more second instructions in the privileged execution mode, wherein the one or more second instructions are executed using the strong instruction ordering mode;
switching the memory consistency mode of the processing device to a relaxed instruction ordering mode; and
executing one or more additional instructions using the relaxed instruction ordering mode.

17. The non-transitory machine-readable storage medium of claim 16,
wherein switching the memory consistency mode of the processing device to the relaxed instruction ordering mode is responsive to executing one or more third instructions that cause the processing device to exit the privileged execution mode.

18. The non-transitory machine-readable storage medium of claim 16, wherein switching the memory consistency mode of the processing device to the strong instruction ordering mode is responsive to executing the one or more first instructions.

19. The non-transitory machine-readable storage medium of claim 16, wherein the one or more first instructions are executed in response to one or more of: a kernel system call, a hardware interrupt, an inter-processor interrupt, a timer interrupt, or a memory fault.

20. The non-transitory machine-readable storage medium of claim 16, wherein the one or more first instructions are executed by application program code, the application program code is associated with an isolated address space, and switching the memory consistency mode of the processing device to the strong instruction ordering mode is responsive to an instruction of the application program code attempting to access a memory location having an address outside the isolated address space.

* * * * *